United States Patent
Wu et al.

(10) Patent No.: US 12,442,148 B2
(45) Date of Patent: Oct. 14, 2025

(54) FISH SCREEN FOR SUCTION STRAINER

(71) Applicants: THE UNITED STATES OF AMERICA AS REPRESENTED BY THE SECRETARY OF AGRICULTURE, Washington, DC (US); Matthew Allen Zolnowsky, Rapid City, SD (US)

(72) Inventors: Samuel Tze-Han Wu, Monrovia, CA (US); Matthew Allen Zolnowsky, Rapid City, SD (US)

( * ) Notice: Subject to any disclaimer, the term of this patent is extended or adjusted under 35 U.S.C. 154(b) by 0 days.

(21) Appl. No.: 18/973,029

(22) Filed: Dec. 8, 2024

(65) Prior Publication Data
US 2025/0101697 A1    Mar. 27, 2025

Related U.S. Application Data

(63) Continuation-in-part of application No. 17/859,051, filed on Jul. 7, 2022, now Pat. No. 12,320,087.

(51) Int. Cl.
    *E02B 1/00*      (2006.01)
(52) U.S. Cl.
    CPC ................................ *E02B 1/006* (2013.01)
(58) Field of Classification Search
    None
    See application file for complete search history.

(56) References Cited

U.S. PATENT DOCUMENTS

| | | | | |
|---|---|---|---|---|
| 243,446 A * | 6/1881 | Haggerty | ............... | B01D 35/30 |
| | | | | 285/192 |
| 407,971 A * | 7/1889 | Siersdorfer | ............. | F16K 31/44 |
| | | | | 137/140 |
| 419,606 A * | 1/1890 | Jewell | .................. | B01D 33/067 |
| | | | | 210/488 |
| 602,488 A * | 4/1898 | Tice | ....................... | B01D 35/28 |
| | | | | D7/400 |
| 705,364 A * | 7/1902 | Kurtz | ...................... | C02F 3/327 |
| | | | | 210/315 |
| 756,517 A * | 4/1904 | Miller | ...................... | A01J 11/12 |
| | | | | 137/131 |

(Continued)

OTHER PUBLICATIONS

"Anadromous Fish Strainers for Use in Wildland Drafting Operations"; Mar. 2003; printed from https://www.fs.fed.us/t-d/pubs/html/03511203/03511203.html.

(Continued)

*Primary Examiner* — Robert J Popovics

(57) ABSTRACT

The fish screen for a suction strainer includes at least one first plate having a central opening formed therethrough, a second plate, a helical spring, and a mesh bag. The helical spring has opposed first and second ends, with the first end secured to the at least one first plate and the second end secured to the second plate. The helical spring has first and second portions positioned respectively adjacent to the first and second ends. The second portion has a smaller diameter than a diameter of the first portion. The mesh bag releasably and removably covers and receives the at least one first plate, the second plate and the helical spring. The second portion of the helical spring is adapted for releasably holding a free end of a suction strainer received within an interior of the helical spring through the central opening of the at least one first plate.

7 Claims, 8 Drawing Sheets

(56) References Cited

U.S. PATENT DOCUMENTS

| | | | | | |
|---|---|---|---|---|---|
| 785,125 | A * | 3/1905 | Shafer | B01D 21/245 | D23/209 |
| 1,102,685 | A * | 7/1914 | Proper | B01D 29/15 | 210/446 |
| 1,230,971 | A * | 6/1917 | Wilson | F04F 10/00 | 210/463 |
| 1,394,011 | A * | 10/1921 | Hills | B01D 35/02 | 210/313 |
| 1,535,112 | A * | 4/1925 | Duke | B01D 24/08 | 210/416.3 |
| 1,548,271 | A * | 8/1925 | Lane | F04B 53/1037 | 210/317 |
| 1,644,121 | A * | 10/1927 | Greene | F04B 53/1037 | 209/400 |
| 1,773,134 | A * | 8/1930 | Fisher | F04B 53/1037 | 210/167.02 |
| 1,908,362 | A * | 5/1933 | Jacobs | F04B 53/1037 | 210/460 |
| 2,014,105 | A * | 9/1935 | Dooley | B01D 27/005 | 210/493.2 |
| 2,067,439 | A * | 1/1937 | Dooley | B01D 27/06 | 285/202 |
| 2,084,587 | A * | 6/1937 | Mcfarlin | F04B 53/1037 | 166/236 |
| 2,306,986 | A * | 12/1942 | Tolman | B01D 39/2003 | 210/486 |
| 2,371,895 | A * | 3/1945 | Kingman | B01D 35/027 | 210/457 |
| 2,372,286 | A * | 3/1945 | Mieras | B01D 35/005 | 184/6.24 |
| 2,374,756 | A * | 5/1945 | Kisch et al. | B01D 29/117 | 4/256.1 |
| 2,424,211 | A * | 7/1947 | Webb | B01D 35/0273 | 419/57 |
| 2,451,067 | A * | 10/1948 | Butler | C02F 1/46176 | 210/497.1 |
| 2,460,084 | A * | 1/1949 | Hebo | B01D 35/14 | 210/356 |
| 2,490,443 | A * | 12/1949 | Knipper | B01D 35/02 | 210/315 |
| 2,503,455 | A * | 4/1950 | Sheren | F04B 53/1037 | 210/318 |
| 2,521,094 | A * | 9/1950 | Rein | B05B 15/30 | 55/505 |
| 2,580,209 | A * | 12/1951 | Wiley | F16L 55/24 | 210/313 |
| 2,641,365 | A * | 6/1953 | Lundeen | B05B 15/30 | D23/209 |
| 2,668,624 | A * | 2/1954 | Wahlin | B01D 29/6484 | 210/460 |
| 2,774,569 | A * | 12/1956 | Jacobsen | E02F 3/925 | 37/318 |
| 2,785,804 | A * | 3/1957 | Fernandez | B01D 46/64 | 210/488 |
| 2,877,903 | A * | 3/1959 | Veres | B01D 35/02 | 210/462 |
| 2,905,327 | A * | 9/1959 | Phillips | B01D 35/027 | 210/457 |
| 2,985,307 | A * | 5/1961 | Grasmere | B01D 29/15 | 210/167.13 |
| 3,023,905 | A * | 3/1962 | Mcdougal | B01D 35/0273 | 210/438 |
| 3,037,636 | A * | 6/1962 | Mcfarlin | F16L 55/24 | 210/429 |
| 3,108,065 | A * | 10/1963 | Mcmichael | B01D 35/26 | 210/172.3 |
| 3,291,313 | A * | 12/1966 | Davis | B01D 33/801 | 210/354 |
| 3,722,686 | A * | 3/1973 | Arnett | B01D 29/01 | 210/242.1 |
| 3,744,640 | A * | 7/1973 | Grover | B01D 39/1661 | 210/172.3 |
| 3,804,258 | A * | 4/1974 | Okuniewski | B01D 29/23 | 285/259 |
| 3,826,372 | A * | 7/1974 | Bell | B01D 35/26 | 210/172.4 |
| 3,833,124 | A * | 9/1974 | Sugiyama | B01D 35/027 | 210/460 |
| 3,900,397 | A * | 8/1975 | Bell | B01D 29/15 | 210/194 |
| 3,959,138 | A * | 5/1976 | Nichols | B01D 29/232 | 210/94 |
| 3,984,330 | A * | 10/1976 | Nichols | B01D 29/232 | 210/460 |
| 4,064,046 | A * | 12/1977 | Gilger | B01D 35/22 | 210/94 |
| 4,204,960 | A * | 5/1980 | Sugiyama | B01D 29/96 | 210/438 |
| 4,263,139 | A * | 4/1981 | Erlich | B01D 29/232 | 210/485 |
| 4,337,008 | A * | 6/1982 | Kulyabko | E02B 1/006 | 405/80 |
| 4,358,372 | A * | 11/1982 | Lundquist | B01D 35/0273 | 210/172.6 |
| 4,411,788 | A * | 10/1983 | Kimura | F02M 37/50 | 210/439 |
| 4,437,431 | A * | 3/1984 | Koch | E02B 8/085 | 405/83 |
| 4,561,977 | A * | 12/1985 | Sasaki | B01D 35/027 | 210/462 |
| 4,618,422 | A * | 10/1986 | Sasaki | B01D 29/925 | 210/485 |
| 4,645,600 | A * | 2/1987 | Filippi | F02M 37/50 | 210/485 |
| 4,743,370 | A * | 5/1988 | Mizusawa | B01D 35/0273 | 210/460 |
| 4,851,118 | A * | 7/1989 | Kurihara | F02M 37/50 | 210/485 |
| 4,874,510 | A * | 10/1989 | Akira | B01D 35/0273 | 210/462 |
| 4,966,522 | A * | 10/1990 | Koyama | B01D 35/0273 | 417/313 |
| 5,089,108 | A * | 2/1992 | Small | B01D 29/15 | 210/287 |
| 5,161,913 | A * | 11/1992 | Boylan | E02B 8/085 | 405/83 |
| 5,230,131 | A * | 7/1993 | Hobson, Jr. | B01D 29/96 | 29/402.06 |
| 5,269,338 | A * | 12/1993 | Figas | F04F 10/00 | 119/245 |
| 5,407,570 | A * | 4/1995 | Hobson, Jr. | B01D 29/15 | 210/232 |
| 5,435,916 | A * | 7/1995 | Schwartz | B01D 29/15 | 210/489 |
| 5,441,637 | A * | 8/1995 | Gutjahr | B01D 35/0273 | 210/485 |
| 5,558,462 | A * | 9/1996 | O'Haver | A01K 79/02 | 210/242.1 |
| 5,662,796 | A * | 9/1997 | Kerecz | B01D 29/15 | 239/315 |
| 6,036,850 | A * | 3/2000 | Reynolds | B01D 29/21 | 210/462 |
| 6,051,132 | A * | 4/2000 | Flores | A01K 63/045 | 210/232 |
| 6,051,138 | A * | 4/2000 | Hobson, Jr. | B01D 29/72 | 55/379 |
| 6,440,303 | B2 * | 8/2002 | Spriegel | B01D 29/15 | 210/232 |
| 6,482,321 | B1 * | 11/2002 | Bossler | B01D 35/0273 | 210/485 |
| 6,488,846 | B1 * | 12/2002 | Marangi | B01D 29/15 | 239/149 |
| 6,682,651 | B1 * | 1/2004 | Toland | B01D 29/15 | 210/162 |
| 6,874,643 | B2 * | 4/2005 | Iwamoto | B01D 35/0273 | 210/486 |
| 6,875,346 | B2 * | 4/2005 | Fox | B01D 29/96 | 210/493.1 |

(56) References Cited

U.S. PATENT DOCUMENTS

| | | | | |
|---|---|---|---|---|
| 6,978,900 | B2* | 12/2005 | Natale | B01D 35/02 29/896.61 |
| 7,025,878 | B2* | 4/2006 | Spriegel | B01D 29/46 210/232 |
| 7,201,842 | B2* | 4/2007 | Kiefer | B01D 35/02 210/162 |
| 7,207,320 | B2* | 4/2007 | Ikeya | F02M 37/14 210/416.4 |
| 7,255,064 | B2 | 8/2007 | Yamamoto | |
| 8,052,868 | B2* | 11/2011 | Sato | F02M 37/24 210/488 |
| 8,974,665 | B2* | 3/2015 | Vreeland | E03F 5/14 210/170.03 |
| 9,212,068 | B2* | 12/2015 | Mock | B01D 63/00 |
| 9,828,721 | B2 | 11/2017 | Silverman et al. | |
| 9,883,660 | B2 | 2/2018 | Naess | |
| 9,930,881 | B2 | 4/2018 | Mefford | |
| 9,982,449 | B1* | 5/2018 | Kennedy | E04H 4/1245 |
| 11,311,825 | B2* | 4/2022 | Hess | E04H 4/1209 |
| 11,628,387 | B2* | 4/2023 | Garner | B01D 35/0273 62/50.6 |
| 11,730,149 | B2* | 8/2023 | Roche | B01D 35/02 210/747.5 |
| 11,832,606 | B1* | 12/2023 | Brubacher | A01M 1/2094 |
| D1,022,120 | S* | 4/2024 | Fox | D23/209 |
| 12,220,653 | B2* | 2/2025 | Lee | B01D 29/15 |
| 12,320,087 | B2* | 6/2025 | Wu | E02B 1/006 |
| 2001/0023846 | A1* | 9/2001 | Spriegel | B01D 29/15 210/460 |
| 2003/0057149 | A1* | 3/2003 | Iwamoto | F02M 37/50 156/308.2 |
| 2003/0127385 | A1* | 7/2003 | Spriegel | B01D 29/15 210/484 |
| 2006/0289346 | A1* | 12/2006 | Kiefer | B01D 35/02 210/167.1 |
| 2011/0017668 | A1* | 1/2011 | Mock | C02F 1/002 210/232 |
| 2011/0233132 | A1* | 9/2011 | Wietharn | B01D 33/50 210/403 |
| 2011/0284442 | A1* | 11/2011 | Williams | B01D 29/58 210/170.09 |
| 2014/0138300 | A1* | 5/2014 | Wietharn | B01D 35/05 210/242.1 |
| 2014/0175014 | A1* | 6/2014 | Mock | B01D 61/18 210/416.3 |
| 2020/0114289 | A1* | 4/2020 | Garner | B01D 35/0273 |
| 2021/0015080 | A1* | 1/2021 | Senecal | F04F 10/00 |
| 2021/0023479 | A1* | 1/2021 | Lee | B01D 29/15 |
| 2023/0024886 | A1* | 1/2023 | Wu | B01D 35/0273 |
| 2023/0226467 | A1* | 7/2023 | Lee | B01D 35/30 210/264 |
| 2024/0350980 | A1* | 10/2024 | McMurray | B01D 69/06 |
| 2025/0101697 | A1* | 3/2025 | Wu | B01D 29/27 |

OTHER PUBLICATIONS

Department of Fisheries and Oceans, Freshwater Intake End-of-Pipe Fish Screen Guideline, Department of Fisheries and Oceans, p. 13, Fig. 5, 1995.
"Gauze Net Filter Pump Protect Hose Mesh Micro Irrigation Water Clean Screen"; printed on Jul. 6, 2022 from https://www.walmart.com/ip/Gauze-Net-Filter-Pump-Protect-Hose-Mesh-Micro-Irrigation-Water-Clean-Screen/699611076?athbdg=L1700.
"Fish Tank Filter Mesh Water Pump Hose Net Clean Screen Pumps Aquarium Supplies"; printed on Jul. 6, 2022 from https://www.walmart.com/ip/Fish-Tank-Filter-Mesh-Water-Pump-Hose-Net-Clean-Screen-Pumps-Aquarium-Supplies/618118826?wmlspartner=wlpa&selectedSellerId=101129668.

* cited by examiner

FISH SCREEN FOR SUCTION STRAINER

CROSS-REFERENCE TO RELATED APPLICATION

This application is a continuation-in-part of U.S. patent application Ser. No. 17/859,051, filed on Jul. 7, 2022, which claims the benefit of U.S. Provisional Patent Application No. 63/221,528, filed on Jul. 14, 2021.

GOVERNMENT LICENSE RIGHTS

This invention was made with government support under cooperative research and development agreement number 21-RD-1113810-029 awarded by the USDA Forest Service. The government has certain rights in the invention.

BACKGROUND

1. Field

The disclosure of the present patent application relates to filtration for suction pipes, hoses and the like, and particularly to a screen for protecting fish from being drawn into, or coming in close contact with, a strainer attached to the end of a suction pipe, hose or the like.

2. Description of the Related Art

Suction strainers are widely used for a variety of different pump and suction-based applications. For example, when a fire hydrant is not available to firefighters, they may engage in water "drafting" from a nearby pond, lake or other body of water. Drafting is performed by attaching a hose to a pump, where one end of the hose is placed in the nearby body of water and the pump pressurizes the water for either direct use for firefighting or for storage in a tank. To prevent large fish, sticks, debris, pollution and the like from being sucked into the hose during the drafting operation, a suction strainer is applied to the end of the hose which is submerged in the water.

FIG. 2 shows a typical prior art suction strainer 100 which is attached to the inlet I of a suction hose H. Suction strainer 100 is a conventional "barrel" strainer, which is in the form of a cylindrical screen for filtering and screening the water as it is sucked through inlet I. Although barrel strainers, such as strainer 100 are common, suction strainers have a wide variety of different shapes and configurations, typically dependent upon the particular application.

Although typical suction strainers are effective at preventing the intake of a wide variety of fish and debris, they are typically provided with screen sizes which still allow small fish through, such as juvenile salmonids, for example, as well as small contaminants, such as sediment and the like. Thus, an additional fish screen with a smaller mesh size may be applied to cover the suction strainer. As shown in FIG. 3A, a conventional fish screen 200 may include a pair of circular plates 202, 204 connected by a helical spring 208, which has a constant diameter. Plate 202 has a central opening 206 for receiving the suction strainer. The plates 202, 204 and the helical spring 208 are covered by a mesh bag 210, which may be secured with a drawstring 212, a strap or the like.

As shown in FIG. 3B, in use, the suction strainer 100 is attached to the hose H and the suction strainer 100 is inserted inside helical spring 208 through opening 206 in plate 202. The mesh bag 210 covers the plates 202, 204, the helical spring 208 and the suction strainer 100. The mesh bag 210 is held in place by tightening drawstring 212, a strap or the like about hose H.

As shown in FIG. 3B, the diameters of the helical spring 208 and the mesh bag 210 are relatively large when compared against the diameter of the hose H and the suction strainer 100. This is because larger fish strainers have been found to cause less stress to the fish. For a fish screen that is sized to fit snugly over the suction strainer, any fish that contacts or is adjacent to the screen will feel the full force of suction at the inlet of the hose. By increasing the radius around the inlet, the suction force is decreased, thus putting less stress on the fish. However, as can be seen in FIG. 3B, by increasing the size of the fish screen, the suction strainer 100 is provided with a relatively large amount of room in which to move freely. This makes the suction strainer 100 susceptible to damage and being dislodged from the fish screen. Thus, a fish screen for a suction strainer solving the aforementioned problems is desired.

SUMMARY

A fish screen for a suction strainer is a screen for protecting fish from being drawn into, or coming in close contact with, a strainer attached to the end of a suction pipe, hose or the like. The present fish screen for a suction strainer includes at least one first plate having a central opening formed therethrough, a second plate, a helical spring, and a mesh bag. The helical spring has opposed first and second ends, with the first end secured to the at least one first plate and the second end secured to the second plate. The at least one first plate is spaced apart from the second plate with the helical spring extending therebetween. As a non-limiting example, each of the at least one first plate and the second plate may have a circular contour. The helical spring has first and second portions positioned respectively adjacent to the first and second ends. The second portion of the helical spring has a smaller diameter than a diameter of the first portion of the helical spring.

The mesh bag releasably and removably covers and receives the at least one first plate, the second plate and the helical spring. The second portion of the helical spring is sized and shaped for releasably holding at least a free end of a suction strainer received within an interior of the helical spring through the central opening of the at least one first plate. The mesh bag may have a strap, a drawstring or the like for releasably sealing an opening of the mesh bag about a hose attached to the suction strainer.

In one embodiment, the first portion of the helical spring has a constant first diameter and the second portion of the helical spring has a constant second diameter. It should be understood that a variety of different helical springs may be manufactured such that the second diameter of the second portion is appropriately sized for securely receiving a particular size and/or style of suction strainer. Similarly, it should be understood that the at least one first plate, the second plate, the helical spring and the mesh bag may each be manufactured in a variety of different sizes and shapes, dependent upon the particular size and style of the suction strainer being used.

In an alternative embodiment, the helical spring has a tapered contour, such that the diameter of the helical spring at its first end is at a maximum, and the diameter at its second end is at a minimum, with the smaller diameter second portion again being sized to releasably receive at least the free end of the suction strainer.

In another alternative embodiment, the helical spring has opposed first and second ends, with the first end being secured to the at least one first plate and the second end being secured to the second plate, where the helical spring is divided into first, second and third portions. The first portion is positioned adjacent to, and includes, the first end, the third portion is positioned adjacent to, and includes, the second end, and the second portion is positioned between the first and third portions. The second portion of the helical spring has a smaller diameter than a maximum diameter of the first portion of the helical spring and a smaller diameter than a maximum diameter of the third portion of the helical spring. The helical spring may have a substantially hourglass shape.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
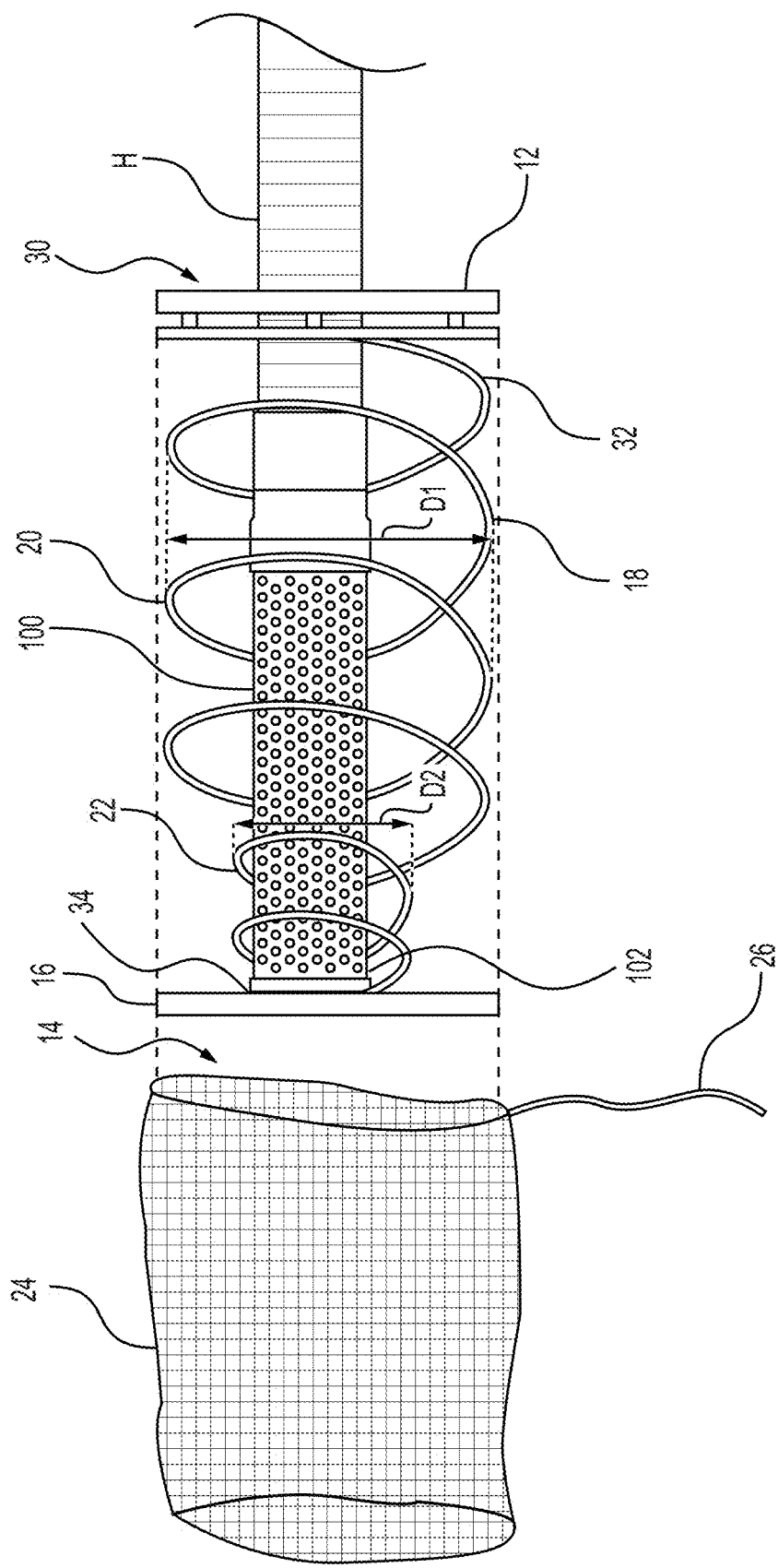
FIG. 1A is a partially-exploded side view of a fish screen for a suction strainer.
Figure 1B:
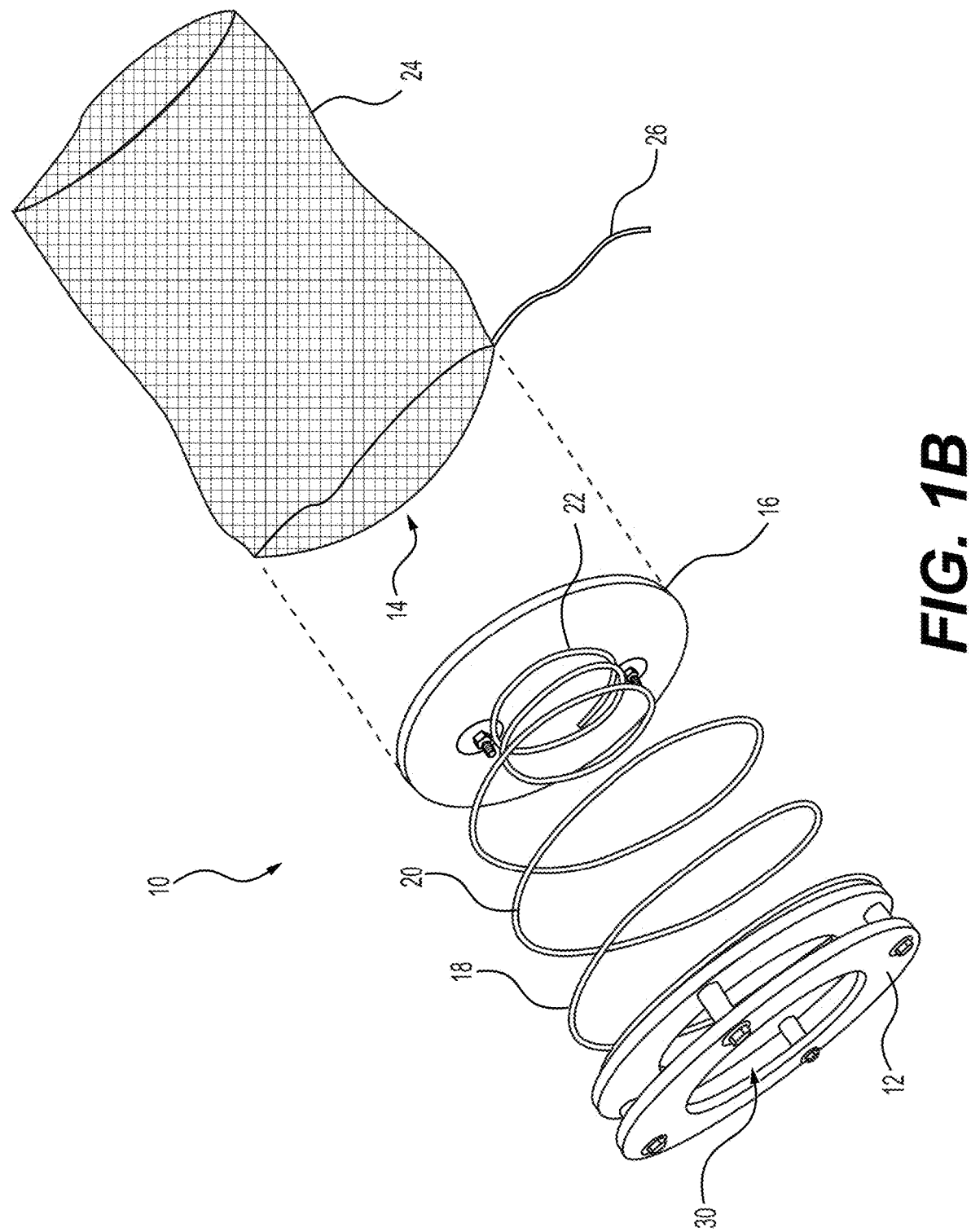
FIG. 1B is a partially-exploded perspective view of the fish screen for a suction strainer of FIG. 1A.
Figure 2:
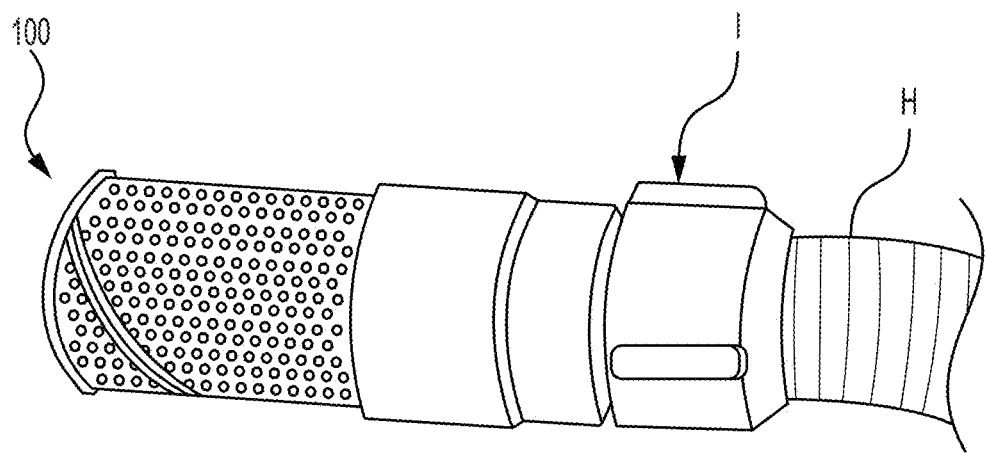
FIG. 2 shows a typical prior art suction strainer.
Figure 3A:
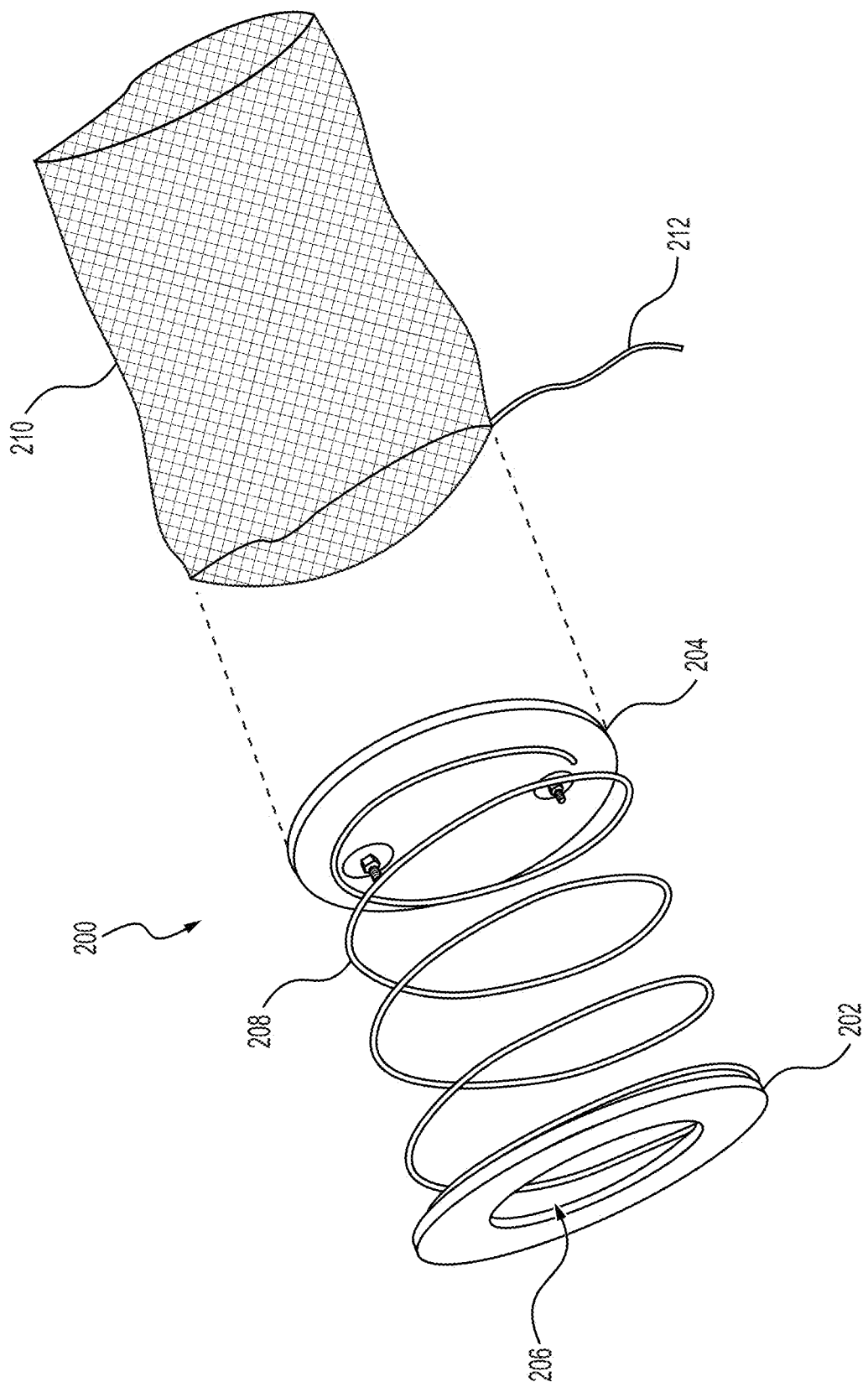
FIG. 3A is a partially-exploded perspective view of a conventional prior art fish screen for use with the suction strainer of FIG. 2.
Figure 3B:
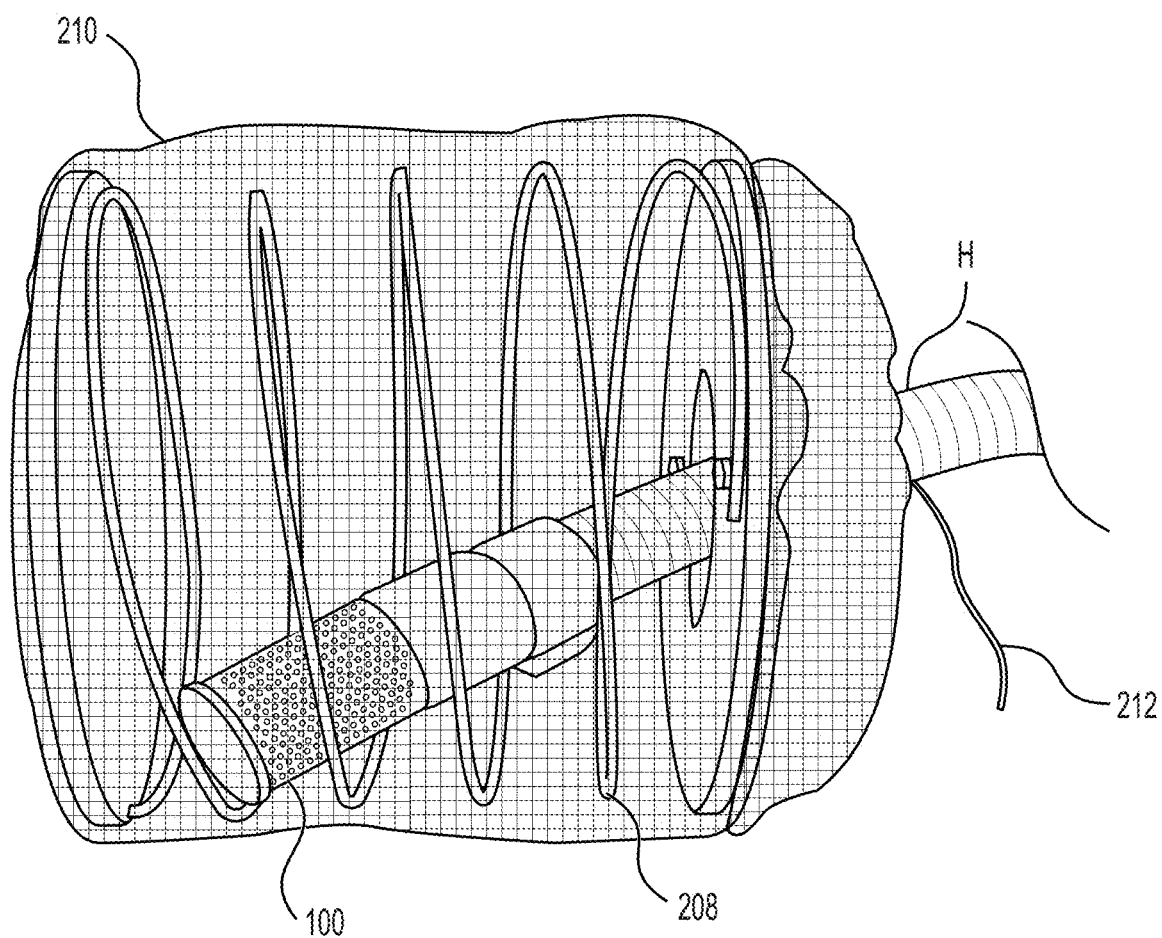
FIG. 3B is a perspective view of the prior art fish screen of FIG. 3A attached to the suction strainer of FIG. 2.

The present fish screen for a suction strainer 10 is a screen for protecting fish from being drawn into, or coming in close contact with, a strainer attached to the end of a suction pipe, hose, or the like. As shown in FIGS. 1A and 1B, the fish screen for a suction strainer 10 includes at least one first plate 12 having a central opening 30 formed therethrough, a second plate 16, a helical spring 18, and a mesh bag 24. In the non-limiting example of FIGS. 1A and 1B, the at least one first plate 12 is shown as being formed from a pair of ring-shaped plates secured together. However, it should be understood that the at least one first plate 12 may be formed from any desired number of plates, including a single plate. It should also be understood that any of the one or more first plates 12 should have the central opening 30 formed through each plate. Additionally, in the non-limiting example of FIGS. 1A and 1B, each of the at least one first plate 12 and second plate 16 is shown as having a circular contour, with a circular central opening 30 formed through the at least one first plate 12. It should be understood that the at least one first plate 12, the second plate 16 and the central opening 30 may have any suitable contours, including but not limited to triangles, squares, rectangles, diamonds, and the like.

Further, it should be understood that the overall contouring, relative dimensions, and overall configuration of the at least one first plate 12, the second plate 16, the helical spring 18 and the mesh bag 24 are shown in FIGS. 1A and 1B for exemplary purposes only. It should also be understood that the at least one first plate 12 and the second plate 16 may be made from any suitable type of non-corrosive and non-toxic material, such as, by way of non-limiting example plastic, stainless steel or the like.

The helical spring 18 has opposed first and second ends 32, 34, respectively, with the first end 32 secured to the at least one first plate 12 and the second end 34 secured to the second plate 16. In the non-limiting example of FIG. 1B, the helical spring 18 is shown secured to the at least one first plate 12 and the second plate 16 by bolts, however, it should be understood that the helical spring 18 may be secured to the at least one first plate 12 and the second plate 16 by any suitable type of attachment. The at least one first plate 12 is spaced apart from the second plate 16, with the helical spring 18 extending therebetween. The helical spring 18 has first and second portions 20, 22, respectively, which are positioned respectively adjacent to the first and second ends 32, 34; i.e., the first portion 20 is closest to first end 32 and the at least one first plate 12, and the second portion 22 is closest to second end 34 and the second plate 16. As will be discussed in greater detail below, the second portion 22 of the helical spring 18 has a smaller diameter D2 than a diameter D1 of the first portion 20 of the helical spring 18.

The mesh bag 24 releasably and removably covers and receives the at least one first plate 12, the second plate 16 and the helical spring 18. As illustrated in FIG. 1A, the second portion 22 of the helical spring 18 is sized and shaped for releasably holding at least a free end 102 of a suction strainer 100 received within an interior of the helical spring 18 through the central opening 30 of the at least one first plate 12. As shown, the mesh bag 24 may have a drawstring 26 for releasably sealing an opening 14 of the mesh bag 24 about a hose H attached to the suction strainer 100. It should be understood that the drawstring 26 may be replaced by, or used in conjunction with, any suitable type of attachment for securing the mesh bag 24 and/or the at least one first plate 12, the second plate 16 and/or the helical spring 18 to the hose H and/or the suction strainer 100, such as, for example, a strap, a buckle, clips or the like. In one embodiment, such as the embodiments of FIGS. 1A and 1B, the second plate 16 is inserted in the mesh bag first, followed by the helical spring 18 and then the at least one first plate 12.

In the embodiment of FIGS. 1A and 1B, the first portion 20 of the helical spring 18 has a constant first diameter D1, and the second portion 22 of the helical spring 18 has a constant second diameter D2, with the constant second diameter D2 being smaller than the constant first diameter D1. It should be understood that a variety of different helical springs 18 may be manufactured such that the second diameter D2 of the second portion 22 is appropriately sized for securely receiving a particular size and/or style of suction strainer 100. In this regard, the smaller second diameter D2 of the second portion 22 should be only slightly larger than a diameter of the suction strainer 100 to ensure the suction strainer 100 remains relatively secure and does not have freedom of motion throughout the mesh bag 24. Likewise, the suction strainer 100 has a relatively small amount of room in which to move freely in the mesh bag 24. This reduces wear and tear on the mesh bag 24, as well as reducing the susceptibility of the suction strainer 100 to damage and being dislodged from the fish screen. Similarly, it should be understood that the at least one first plate 12, the second plate 16, the helical spring 18 and the mesh bag 24 may each be manufactured in a variety of different sizes and shapes, all while keeping the same relative configuration as described herein, dependent upon the particular size and style of the suction strainer 100 and/or hose H being used. It should be further understood that suction strainer 100 and hose H are shown in FIG. 1A for exemplary and illustrative purposes only.

Figure 4:
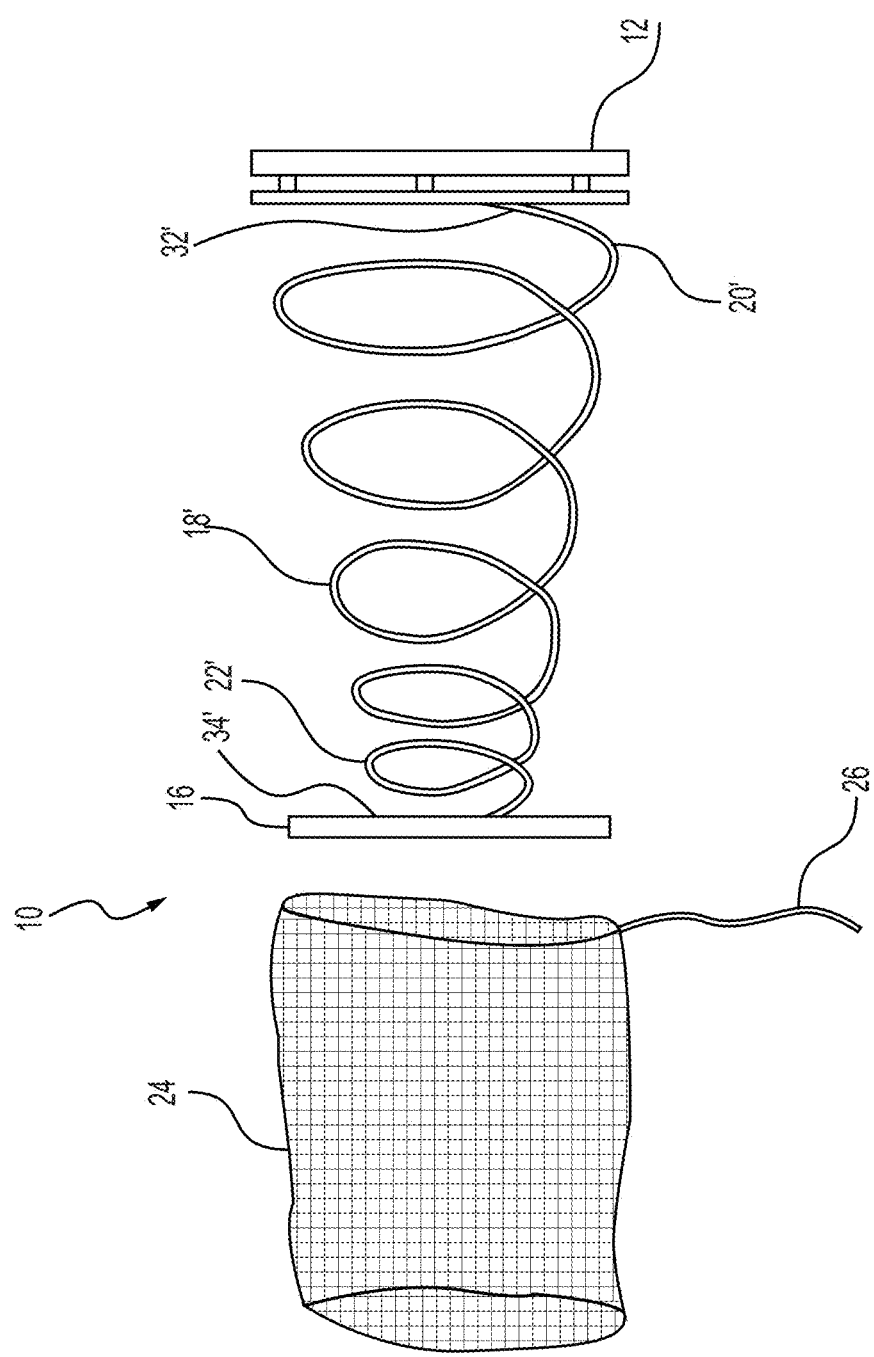
FIG. 4 is a partially-exploded side view of an alternative embodiment of the fish screen for a suction strainer of FIGS. 1A and 1B.

In the alternative embodiment of FIG. 4, helical spring 18 is replaced by helical spring 18', which has a tapered contour. In the embodiment of FIG. 4, the diameter of the helical spring 18' at its first end 32' is at a maximum, and the diameter at its second end 34' is at a minimum, with the smaller diameter second portion 22' again being sized to releasably receive at least the free end of the suction strainer. Because of the constantly tapered shape from first end 32' to second end 34', the second portion 22' will always have a smaller diameter than the first portion 20'.

It should be understood that mesh bag 24 may be made of any suitable type of mesh fabric or the like which has a porosity small enough such that small fish, debris, sediment and the like cannot pass therethrough, and which is also safe and non-toxic to marine life. Mesh bag 24 is preferably also formed from a material which is strong enough to resist damage and tearing from debris, pollutants, marine life and the like. When the fish screen for a suction strainer 10 is not in use, the mesh bag 24 may be removed, and the at least one first plate 12 and the second plate 16 may be compressed together (through compression of the helical spring 18) for storage. In one embodiment, the mesh bag 24 is sized to have a diameter just slightly larger than the diameter D1 of the at least one first plate 12. In other embodiments, the mesh bag 24 has a diameter much larger than the diameter D1 of the at least one first plate 12.

Figure 5:
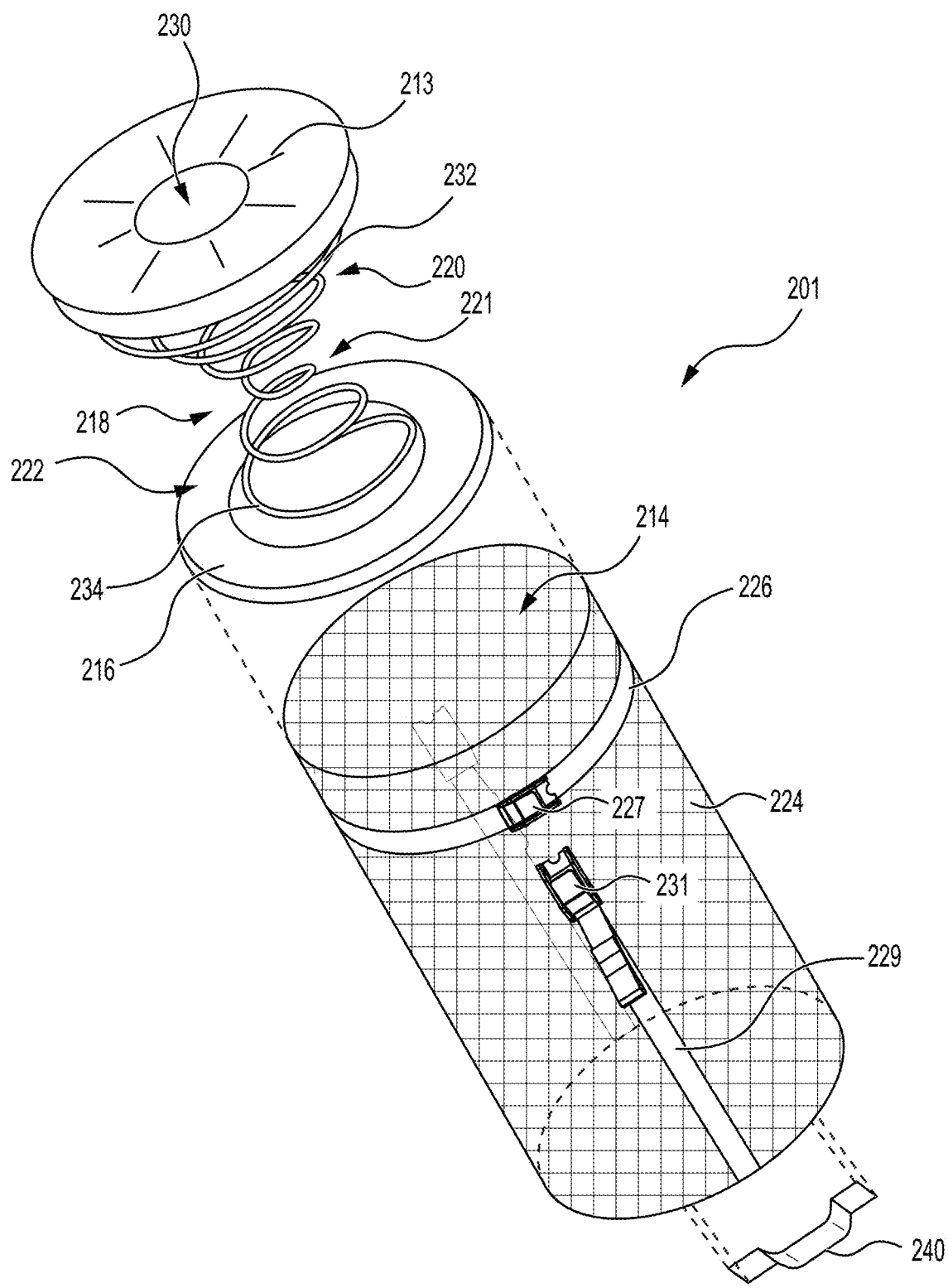
FIG. 5 is a partially exploded, perspective view of another alternative embodiment of the fish screen for a suction strainer.
Figure 6:
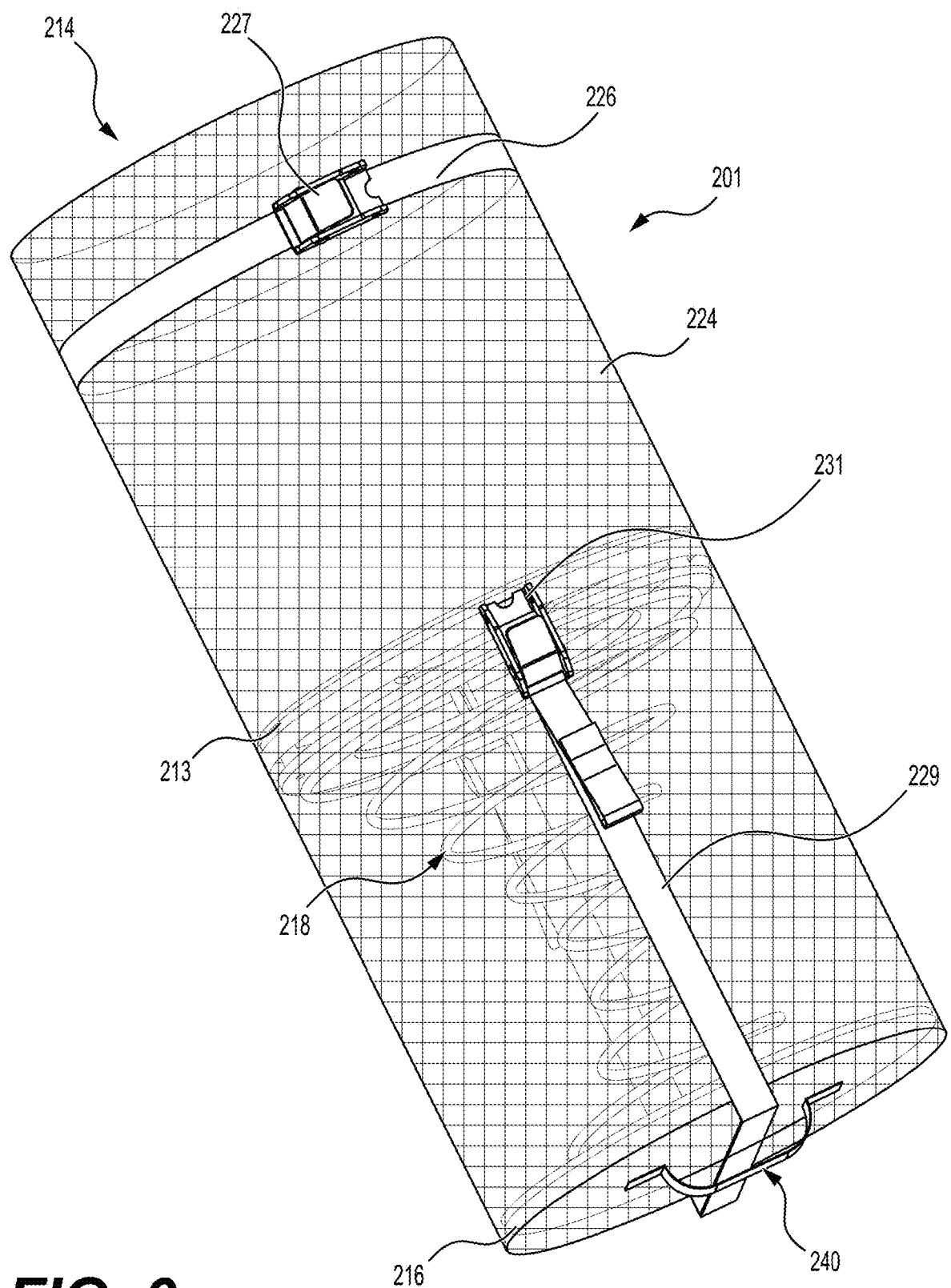
FIG. 6 is a perspective view of the fish screen for a suction strainer of FIG. 5.

In the further alternative embodiment of FIGS. 5 and 6, the fish screen for a suction strainer 201 includes at least one first plate 213 having a central opening 230 formed therethrough, a second plate 216, a helical spring 218, and a mesh bag 224, similar to the previous embodiments. It should be understood that the at least one first plate 213 may be formed from any desired number of plates, including a single plate. It should also be understood that any of the one or more first plates 213 should have the central opening 230 formed through each plate. Additionally, in the non-limiting example of FIGS. 5 and 6, each of the at least one first plate 213 and second plate 216 is shown as having a circular contour, with a circular central opening 230 formed through the at least one first plate 213. It should be understood that the at least one first plate 213, the second plate 216 and the central opening 230 may have any suitable contours, including, but not limited to, triangles, squares, rectangles, diamonds, and the like.

Further, it should be understood that the overall contouring, relative dimensions, and overall configuration of the at least one first plate 213, the second plate 216, the helical spring 218 and the mesh bag 224 are shown in FIGS. 5 and 6 for exemplary purposes only. It should also be understood that the at least one first plate 213 and the second plate 216 may be made from any suitable type of non-corrosive and non-toxic material, such as, by way of non-limiting example, plastic, stainless steel or the like.

The helical spring 218 has opposed first and second ends 232, 234, respectively, with the first end 232 secured to the at least one first plate 213 and the second end 234 secured to the second plate 216. It should be understood that the helical spring 218 may be secured to the at least one first plate 213 and the second plate 216 by any suitable type of attachment. The at least one first plate 213 is spaced apart from the second plate 216, with the helical spring 218 extending therebetween. The helical spring 218 has first, second and third portions 220, 221 and 222, respectively. The first and third portions 220 and 222, respectively, are positioned respectively adjacent to the first and second ends 232, 234; i.e., the first portion 220 is closest to first end 232 and the at least one first plate 213, and the third portion 222 is closest to second end 234 and the second plate 216. The second portion 221 is positioned between the first and second portions 220 and 22. As shown, in the embodiment of FIGS. 5 and 6, the second portion 221 of the helical spring 218 has a smaller diameter D4 than a maximum diameter D3 of the first portion 220 or a maximum diameter D5 of the third portion 222. In the non-limiting example of FIGS. 5 and 6, the helical spring 218 has an hourglass shape, with helical spring 218 being substantially symmetrical about its center and with first and third portions 220 and 222 each being substantially conical. In the non-limiting example of FIGS. 5 and 6, first and third portions 220 and 222 are shown having substantially identical dimensions, including substantially equal maximum diameters D3 and D5, respectively. However, it should be understood that helical spring 218 may have any suitable shape and relative dimensions such that the second portion 221 of the helical spring 218 has a smaller diameter D4 than the maximum diameter D3 of the first portion 220 or the maximum diameter D5 of the third portion 222.

The mesh bag 224 releasably and removably covers and receives the at least one first plate 213, the second plate 216 and the helical spring 218, as in the previous embodiments. Similar to the previous embodiments, the second portion 222 of the helical spring 218 is sized and shaped for releasably holding at least the free end 102 of the suction strainer 100 received within an interior of the helical spring 218 through the central opening 230 of the at least one first plate 213. In the embodiment of FIGS. 5 and 6, the drawstring 26 is replaced by a strap 226 which may be adjusted and secured by a buckle 227 or the like in order to releasably seal the opening 214 of the mesh bag 224 about the hose H attached to the suction strainer 100. It should be understood that mesh bag 224 may have any suitable shape, depending on the particular shape and dimensions of the at least one first plate 213 and the second plate 216. In the non-limiting example of FIGS. 5 and 6, the mesh bag 224 has a cylindrical shape and, as a further non-limiting example, may have a diameter of approximately 12 inches. In this further non-limiting example, when the helical spring 218 is fully expanded, as shown in FIGS. 5 and 6, the helical spring 218 may have a height of approximately 11 inches.

An additional strap or web 229 may also be secured to mesh bag 224, as shown in FIGS. 5 and 6, which at least partially extends along the axial direction of mesh bag 224. By adjusting the length of the strap or web 229 using a buckle 231 or the like, the mesh bag 224 may be easily collapsed by shortening the strap or web 229. As shown in FIG. 6, a buckle 231 may be secured to the at least one first plate 213 through the mesh bag 224. Thus, when the strap or web 229 is shortened (i.e., tightened about the mesh bag 224), the helical spring 218 is compressed, thus compacting both the mesh bag 224 and the internal structure formed from the at least one first plate 213, the second plate 216 and the helical spring 218, allowing the fish screen 100 to be collapsed for storage when not in use. A handle or web 240 may be secured to the bottom of mesh bag 224, as shown, allowing the fish screen 100 to be easily carried when not in use.

It is to be understood that the fish screen for a suction strainer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A fish screen for a suction strainer, comprising:
   at least one first plate having a central opening formed therethrough;
   a second plate;
   a helical spring having opposed first and second ends, the first end being secured to the at least one first plate and the second end being secured to the second plate, the helical spring having first, second and third portions, the first portion being positioned adjacent to, and including, the first end, the third portion being positioned adjacent to, and including, the second end, and the second portion being positioned between the first and third portions, and wherein the second portion of the helical spring has a smaller diameter than a maximum diameter of the first portion of the helical spring and a smaller diameter than a maximum diameter of the third portion of the helical spring; and
   a mesh bag for releasably covering and receiving the at least one first plate, the second plate and the helical spring,
   whereby the second portion of the helical spring is adapted for releasably holding a free end of a suction strainer received within an interior of the helical spring through the central opening of the at least one first plate.

2. The fish screen for a suction strainer as recited in claim 1, wherein each of the at least one first plate and the second plate has a circular contour.

3. The fish screen for a suction strainer as recited in claim 1, wherein the maximum diameter of the first portion of the helical spring is equal to the maximum diameter of the third portion of the helical spring.

4. The fish screen for a suction strainer as recited in claim 3, wherein the helical spring has an hourglass shape.

5. The fish screen for a suction strainer as recited in claim 1, further comprising a strap for releasably sealing an opening of the mesh bag about a hose attached to the suction strainer.

6. The fish screen for a suction strainer as recited in claim 5, further comprising a buckle for adjusting a length of the strap.

7. The fish screen for a suction strainer as recited in claim 1, further comprising a handle secured to the mesh bag.

* * * * *